United States Patent [19]

Nordström

[11] 3,998,579

[45] Dec. 21, 1976

[54] DEVICE FOR PRODUCING EXTERNALLY RIBBED PIPES OF PLASTIC

[76] Inventor: Erik Gustav Wendel Nordström, Box 84, 840 20 Ange, Sweden

[22] Filed: Oct. 17, 1974

[21] Appl. No.: 515,568

[30] Foreign Application Priority Data

Oct. 22, 1973 Sweden ............................ 7314295

[52] U.S. Cl. ............................... 425/393; 425/113; 425/369; 425/396

[51] Int. Cl.² ................... B29D 23/04; B29D 23/18

[58] Field of Search .......... 425/112, 113, 223, 233, 425/336, 280, 281, 369, 371, 392–396

[56] References Cited

UNITED STATES PATENTS

| | | | |
|---|---|---|---|
| 3,045,281 | 7/1962 | Skobel | 425/113 |
| 3,387,348 | 6/1968 | Kilgallon | 425/112 X |
| 3,486,196 | 12/1969 | Klenk et al. | 425/133.1 |
| 3,494,812 | 2/1970 | Cuacho | 425/112 X |
| 3,526,692 | 9/1970 | Onaka | 425/112 X |
| 3,538,207 | 11/1970 | Toole | 425/113 |
| 3,557,404 | 1/1971 | Zippel et al. | 425/395 |
| 3,677,676 | 7/1972 | Hegler | 425/112 X |
| 3,743,456 | 7/1973 | Cini | 425/133.1 |
| 3,751,541 | 8/1973 | Hegler | 425/392 X |
| 3,819,778 | 6/1974 | Maroschak | 425/336 X |
| 3,891,007 | 6/1975 | Kleykamp | 425/396 |

*Primary Examiner*—Richard B. Lazarus
*Assistant Examiner*—Carl Rowold
*Attorney, Agent, or Firm*—Silverman & Cass, Ltd.

[57] ABSTRACT

A device for producing gilled pipes of plastic or other extrudable material, the device comprising two sets of mold jaw halves arranged on an endless line, one set running in a clockwise direction and the other set running in a counterclockwise direction, said mold jaw halves being brought to run close one to the other between a fixed groove shaped guiding rail and a parallel spring-biased guiding rail to define an entrance and an outlet, a nozzle is provided at the entrance and is capable of feeding material to be extruded thereto. A mandrel is positioned between the jaws concentric with the nozzle; the mandrel has an outer end shaped at least along a part of its length substantially as a truncated cone, the diameter of which increases in the direction away from the extrusion nozzle whereby to define with the mold jaws, a channel, the outer walls of the channel being formed by the mold jaws surrounding the mandrel and extending in the longitudinal direction of the mandrel, the inner sides of the mold jaws defining the outer shape of the pipe to be made and being provided with spaced substantially annular grooves. The angle between the generatrix and the longitudinal axis of the truncated cone is acute and less than 45° so that the material by force will be pressed into the grooves by the conical portion of the mandrel head while jaws are passing the mandrel head so that the grooves of the mold jaws will be substantially filled at the same time as the pipe wall with an even inner wall in a longitudinal direction is being formed around the mandrel head.

16 Claims, 15 Drawing Figures

DEVICE FOR PRODUCING EXTERNALLY RIBBED PIPES OF PLASTIC

The present invention relates to a device for producing gilled pipes of plastic or some other extrudable material, and pipes being provided with an even inner side. The pipes are intended for serving as cable ducts, ground drainage pipes or the like.

There are previously known devices for extruding plastic materials by an annular nozzle into running mould jaws having corrugations in their inner sides and pressing the plastic material against the inner sides of said mould jaws by air pressure in order to produce pipes with corrugations on their outer side. A drawback in these devices is, that the grooves of the running mould jaws might not be completely filled with the plastic material, so that also the inner side of the pipe will be more or less corrugated.

It is an object of the present invention to provide a device, by which said drawbacks are avoided and by which pipes can be produced of plastic or some other extrudable material, said pipes having completely filled fins, a uniform wall thickness between the fins and an even inner side.

The present invention relates to a device for producing gilled pipes of plastic or some other extrudable material, which pipes have an even inner side in the longitudinal direction, said device being provided with means for pressing material coming from an extruder into a channel around a mandrel, said mandrel having the outer end shaped as a head, said head being shaped, at least along a part of its length, substantially as a truncated cone, the diameter of which is increasing in the direction from the extrusion nozzle, said channel having an annular cross section, the outer walls of said channel being formed by mould jaws surrounding the mandrel and running in the longitudinal direction of the mandrel, the inner sides of said mould jaws defining the outer shape of the pipe to be made and being provided with substantially annular grooves. The invention is characterized by the fact, that the angle between the generatrix and the longitudinal axis of said truncated cone is acute and less than 45°, so that the material be force will be pressed into said grooves by the conical part of the mandrel head while the mould jaws are passing the mandrel head, so that said grooves of the mould jaws will be substantially filled, at the same time as the pipe wall with an even inner side in the longitudinal direction is being formed around the mandrel head.

In the following the device according to the invention will be explained more in detail, in connection with the description of some embodiments, which are shown on the attached drawings.

Figure 1:
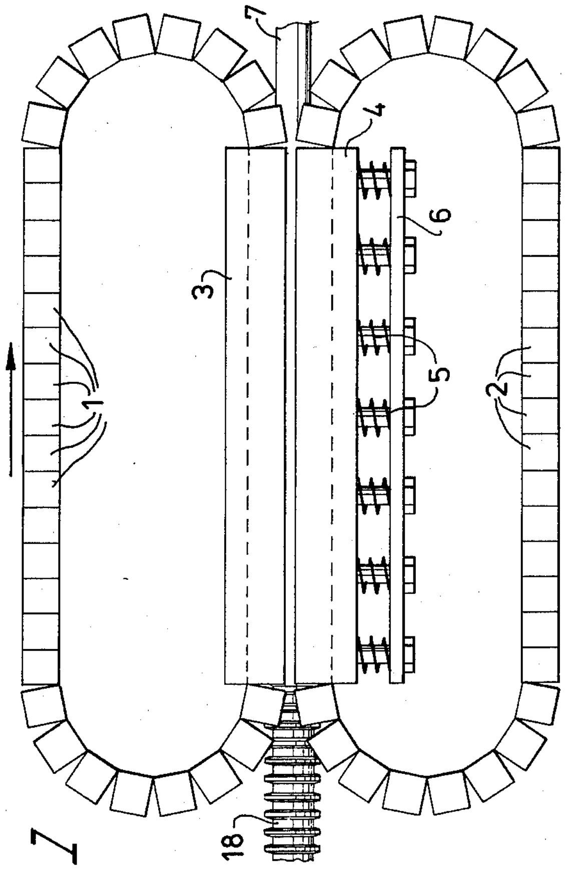
FIG. 1 shows a schematic view of a device according to the invention.

The device shown in FIG. 1 comprises two sets of mould jaw halves 1 and 2, which are arranged on an endless line and are running in the direction indicated by the arrows, and which along a certain distance are brought to run close to each other under guidance in a fixedly located, groove shaped guiding rail 3 and a within certain limits displaceable, groove shaped guiding rail 4, which is pressed in the direction towards the guiding rail 3 by pressure springs 5, said pressure springs being pressed between the guiding rail 4 and a stationary abutment 6. In the two groove shaped guiding rails there are roller bearings, against which the mould jaws 1, 2 run. At the place where the mould jaw halves run together there is a nozzle sleeve 7, which is connected to a container (not shown) with material to be extruded.

Figure 2:
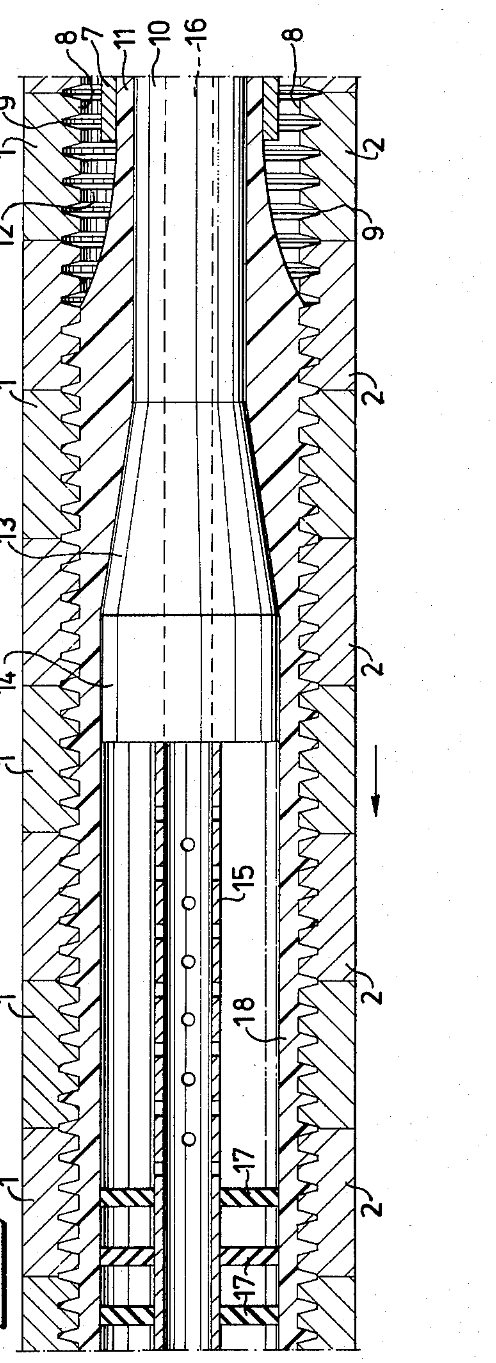
FIG. 2 shows on a larger scale a horizontal section of a part of the device of FIG. 1.

FIG. 2 shows mould jaw halves 1, 2 with their half cylindrical inner sides 8 and annular grooves 9 therein, and also the nozzle sleeve 7 and a mandrel 10 situated therein, the outer diameter of said mandrel being smaller than the inner diameter of said sleeve 7, so that a tubular channel 11 is formed for the material. The mandrel 10 extends a substantial distance, about 4–5 times the diameter of the mandrel, out of the opening of the nozzle sleeve, so that a channel 12 is formed between said extension of the mandrel 10 and the surrounding mould jaw halves 1, 2. The mandrel 10 is provided with a conical part 13, the axial length of which is at least equal to half the value by which the diameter of the mandrel is increased and preferably equal to or greater than one and a half times of said value, whereby that part of the channel 12, which is adjacent to the conical part 13, becomes wedge-shaped in an axial section. The outer end of the mandrel 10 has the shape of a cylindrical head 14 with an outer diameter, which corresponds to the inner diameter of the pipe to be made, and with an axial length which extends along at least three but preferably more annular grooves 9 of the mould jaw halves. At least the conical part 13 and the head 14 are polished. The annular grooves 9 preferably are thinner towards the bottom, whereby the fins of the gilled pipe will be thicker at the base than at the outer periphery. The fins can also be made very thin, whereby the thermal conductivity of the pipe will decrease and material can be saved.

At the end surface of the mandrel a perforated tube 15 is attached, which is connected to an air supply conduit 16 in the mandrel and which is provided with three sealing rings 17 or reinforced rubber. The outer diameters of the sealing rings 17 are the same as the outer diameter of the mandrel head 14.

Figure 4:
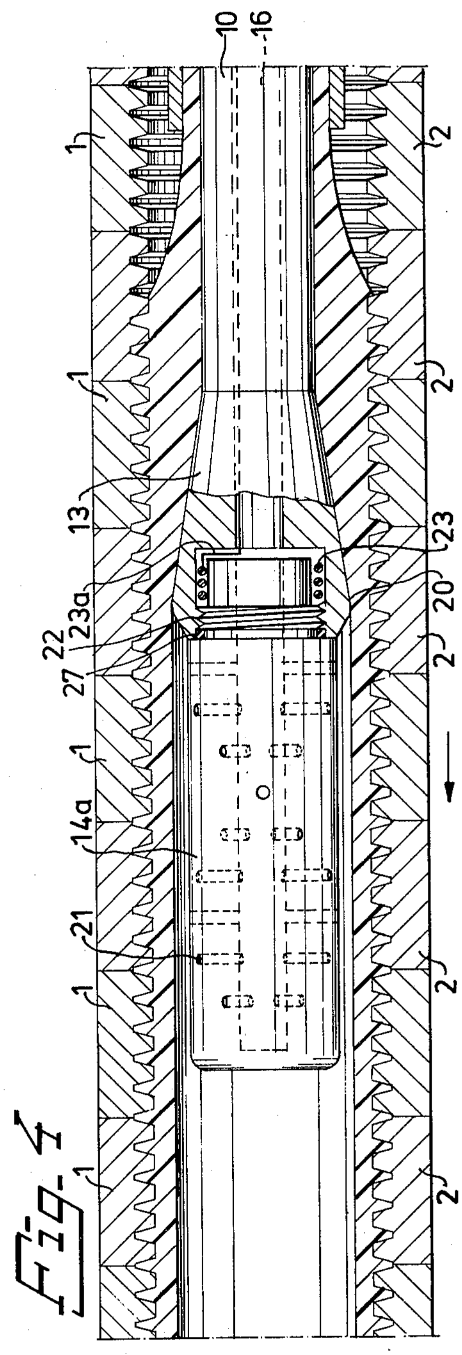
FIG. 4 shows in a horizontal section a part of the device with a modified mandrel.

According to a modified embodiment of the device according to the invention shown in FIG. 4 the mandrel 10 has a conical part 13 and a shoulder 20 with the same diameter as the inner diameter of the pipe, said shoulder being fixedly connected by threads 22 to an extension 14*a* of the mandrel with a smaller diameter than the inner diameter of the pipe. The mandrel is provided with an air supply conduit 16, from which conduits 21 lead out on the surface of said extension. In the shoulder 20 thermostat-controlled heating coils 23 can be provided, see FIG. 4, which coils are fed by a conductor 23*a*. Said coils are preferably insulated by for example ceramics or Teflon plastic and fed with current from a low voltage current supply source. Between the shoulder and said extension there is a seal 27, which prevents air from the air supply conduit 16 from leaking out through the joint.

Figure 5:
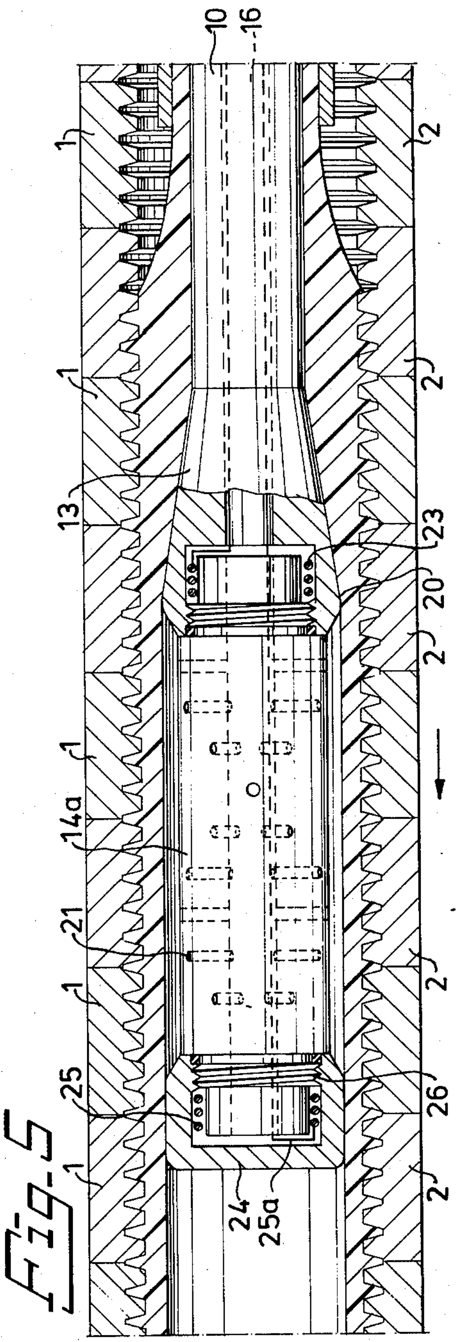
FIG. 5 shows a horizontal section of a part of the device with another modified mandrel.

According to a further embodiment shown in FIG. 5 the mandrel is provided with an air supply conduit 16 with outlet channels 21, a shoulder 20 preferably provided with heating coils and an extension 14*a* of the mandrel with a smaller diameter than the inner diameter of the formed pipe. The outer end of the extension 14*a* is fixedly connected by threads 26 to a further shoulder 24, which has the same diameter as the inner diameter of the formed pipe. Said shoulder is preferably provided with conduits 25 for a cooling medium, which are fed by a supply conduit 25*a*.

Figure 6:
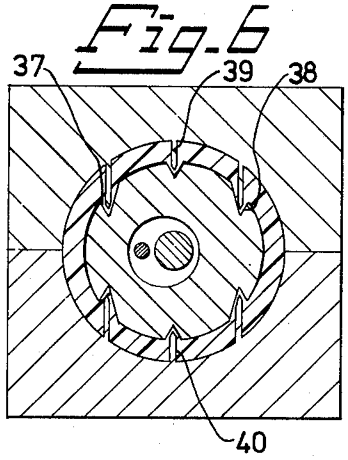
FIG. 6 shows in cross section an embodiment, in which the mandrel is provided with longitudinal grooves and the mould jaws are provided with projections.

According to a modification of the embodiments according to FIGS. 2, 4 and 5 the mandrel or the shoulder or the shoulders of the mandrel can be provided with for example six longitudinal grooves 37, see FIG. 6, for forming longitudinal ridges on the inner wall of the pipe to be made. In that case the mould jaws are provided with the same number of longitudinal lines of correspondingly located and inwardly directed projections 39, which are located preferably in the spaces between the grooves of the jaws for forming the fins of the pipe.

Figure 7:
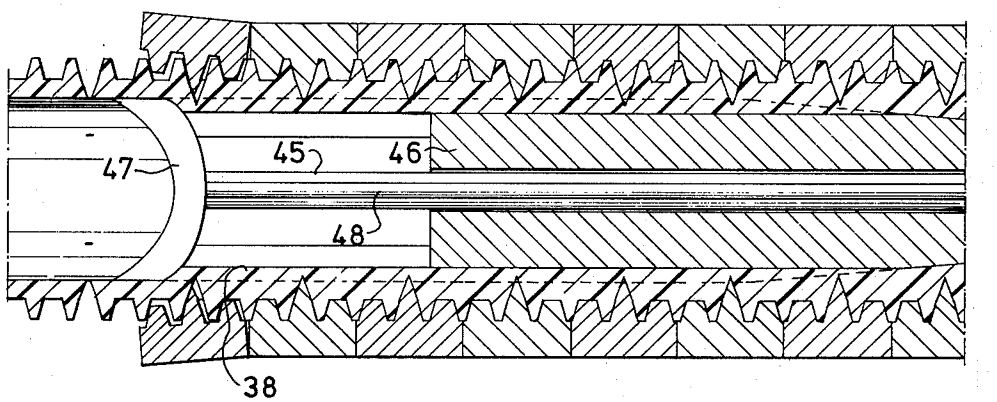
FIG. 7 shows a device for removing ridges from the inner side of the pipe.

FIG. 7 shows a device for removing the ridges in the pipe, which are produced by said grooves in the mandrel. The device comprises a shaft 45 extending through the mandrel and outside of the mandrel head 46 and there is provided with cutting means 47. Said cutting means preferably comprises obliquely arranged cutting blades or knives which are fixedly attached to the shaft. The shaft 45 is preferably rotated by some driving means not shown, said driving means being located inside or outside of the mandrel. The shaft may, however, be fixedly arranged in the mandrel, in which case the cutting means should be suitably shaped for cutting away the ridges as the tube is moved past said cutting means.

Figure 8:
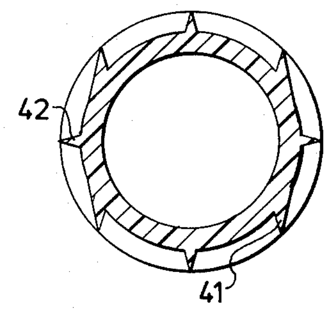
FIG. 8 shows in cross section an embodiment, in which the mould jaws are provided with longitudinal grooves.

FIG. 8 shows another embodiment, in which the mould jaws are provided with longitudinal grooves. The two mould jaws are also provided with chamferings on those sides which are turned against each other for forming two further longitudinal grooves.

Figure 9:
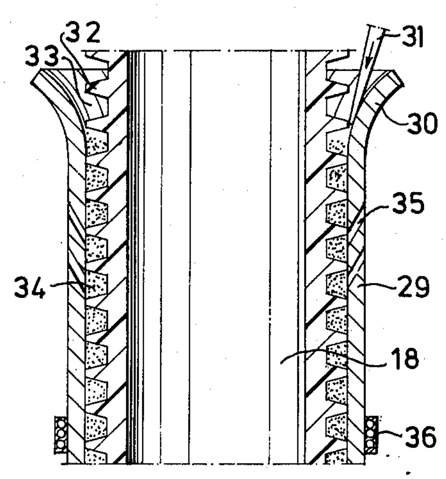
FIG. 9 shows a device according to the invention for filling the spaces between the fins with an insulating material.

FIG. 9 shows a device for filling the spaces between the fins of a pipe which is produced by the device according to FIGS. 1–5. The pipe is moved through a sleeve 29, one end of which is widened. In the space between the pipe and the sleeve one or more nozzles or an annular nozzle is or are arranged (in FIG. 9 only one nozzle is shown for the sake of clarity). The sleeve can be provided with supply conduits 35 for some lubricating material, for example oil, and with conduits 36 for some cooling medium, for example water.

Figure 10:
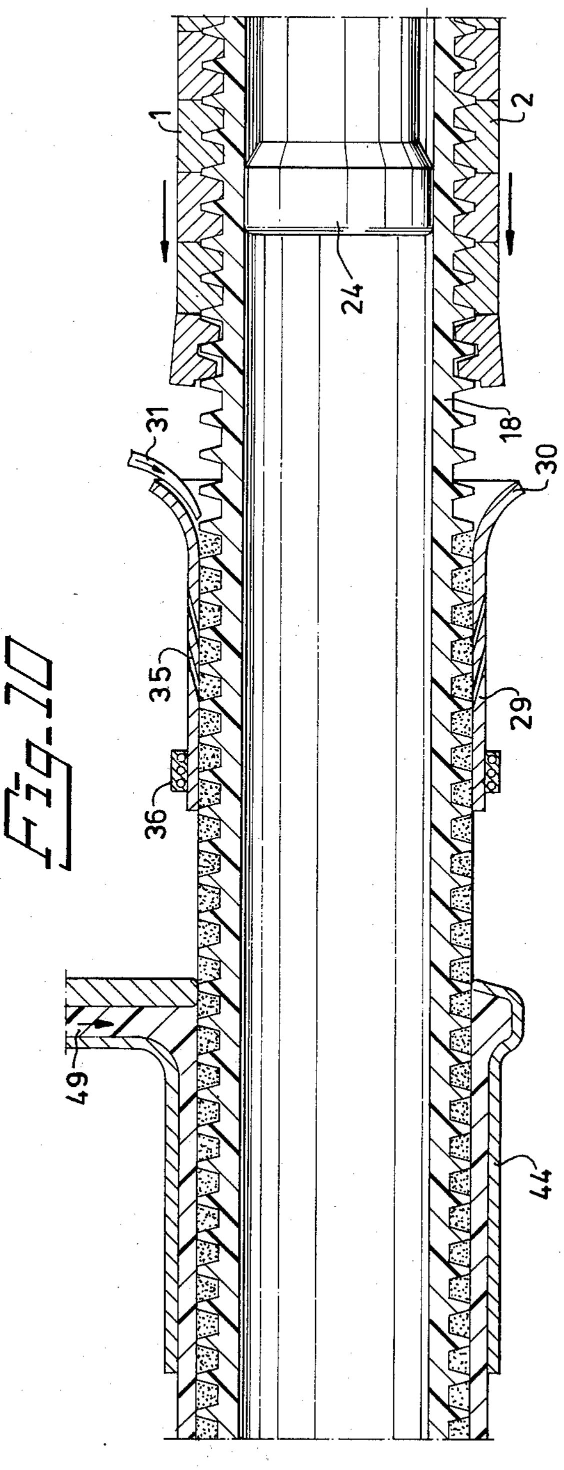
FIG. 10 shows a plant comprising the devices according to FIGS. 1–5 and FIG. 9 together with a device for extruding an outer pipe.

FIG. 10 shows a combination of the devices according to FIGS. 1–5 and FIG. 9 together with a device for extruding an outer pipe. The lastmentioned device comprises a sleeve 44 having a greater inner diameter that the outer diameter of the gilled pipe and one or more nozzles 49.

The grooves 9 of the mould jaws 1, 2 must not necessarily be annular. They can alternatively be helix formed, see FIG. 13. Furthermore the mould jaws can be provided with two sets of grooves which extend helically in opposite directions, see FIG. 14.

The function of the device described above is as follows. When the mould jaw halves 1, 2 are driven in the direction indicated by the arrows in FIG. 2 and material is fed at a sufficient speed from the extruder into the pipe-shaped channel 11 and pressed in the channel 12, this will be filled to such a degree, that the material will also be pressed into the grooves 9 which open into the channel 12, during the effective contribution of the conical part 13 of the mandrel to the complete filling of the grooves 9, whereby the spaces between the inner sides 8 of the jaw halves and the cylindrical outer side of the mandrel head will be completely filled, in order to ensure a uniform thickness of the pipe wall for a pipe 18. The pressure air, which is pressed out of the perforated conduit 15 into the pipe 18, is enclosed between the mandrel head 14 and the sealing rings 17 with the result that the wall of the pipe 18 is pressed against the mould jaw and is effectively cooled.

The material is pressed out of the channel 11 is a quantity which is enough to substantially fill the channel 12, as is shown in FIG. 2, or in other words the material is pressed out of the nozzle channel at a sufficient speed relative to the speed of the mould jaws so that the material will enter the grooves 9 already before they pass the mandrel and, during said passing of the mandrel head, the grooves 9 will be completely filled. If the material is not fed out of the nozzle channel 11 at a sufficient speed, this can be observed in that the fins of the pipe 18 will be incomplete, and if the material is fed at a too high speed it will press apart the jaw halves 1, 2 and penetrate between the surfaces of the jaw halves which are turned towards and abut against each other, that is the line of jaw halves 2 running in the displaceable guide rail 4 will press the guide rail 4 somewhat away from the guide rail 3 against the action of the pressure springs 5, and the material which has penetrated between said surfaces will form an axial ridge which will be visible on the outside of the pipe. In this case said feeding speed of the material must be lowered or the speed of the jaw halves must be increased, until the forming of said ridge will cease. Thus it is easy to control that a perfect pipe is made.

According to a modification of the invention at least the outer cylindrical surface of the outer end of the mandrel head 14 can be heated under thermostatic control, so that a thin surface layer of the inner tube wall will melt and thereby a smooth or glossy inner tube surface is obtained.

According to the modified embodiment in FIG. 4 air is conducted at a high pressure through the openings of the conduits 21 on the extension 14a of the mandrel, and will thereby press the formed pipe outwards at the same time as the pipe is cooled. Due to the small annular space between the extension of the mandrel and the tube wall the sealing rings 17 (FIG. 2) can be deleted. This is advantageous, as the sealing rings 17 sometimes can leave marks in the inner side of the formed pipe.

In the embodiment according to FIG. 5 the shoulder 24 has two objects. Firstly it serves as a sealing, so that the air pressed out by the conduit 21 can not pass out between the end of the extension 14a and the pipe, whereby an effective pressure is maintained between the extension and the pipe. Secondly it serves as a cooling means, as conduits 25 for some cooling medium are arranged in the shoulder in a way shown in FIG. 5. The plastic material is heated and pressed out at first by the shoulder 20. Thereafter it is cooled and pressed out by the air between the extension and the pipe and further cooled and pressed out by the shoulder 24. Thereby a pipe with a completely even inner side is produced. As an alternative the shoulder 24 can be heated, so that the pipe will get a glossy inner side.

In the device according to FIG. 6 the grooves 37 on the mandrel will form longitudinal ridges 38 on the inside of the formed pipe. Simultaneously the projections 39 of the mould jaws will produce recesses 40 on the outside of the pipe, said recesses extending somewhat farther in than what is corresponding to the thickness of the pipe but not so far that the ridges are perforated. After the production of the pipe said ridges 38 can be removed by turning, whereby an apertured pipe is produced which is suitable for example drainage or underground irrigation. If the ridges are not removed a pipe which is perfect for protection of electrical cables is produced, which will offer extremely little friction when the cable is drawn into the pipe.

But by the device shown in FIG. 7 said ridges 38 can alternatively be removed immediately after the extrusion of the pipe. When the cutting means 47 are rotated the ridges are removed. In parallel with or surrounding the shaft 45 a rod or a sleeve 48 can be provided in the mandrel, by which rod or sleeve the cutting means can be adjusted in a way not shown from a position beyond the infeed end of the mandrel. The arrangement can be such, that the cutting means can be set into a position, where they will not touch the ridges of the pipe, whereby the same mandrel can also be used in those cases, when the ridges are intended to be retained in the pipe. Instead of knives a stationary annular cutting means with sufficiently large diameter can be fastened to the mandrel. As the pipe is moving ahead said annular cutting means will continuously cut away the ridges of the pipe.

In the device according to FIG. 8 the grooves of the mould jaws will produce longitudinal ridges 41 on the formed pipe. Also where the two mould jaw halves meet ridges 42 will be formed. In this way the pipe will get a square-net on its outer surface, which will furthermore reinforce the pipe wall, whereby the pipe wall in itself can be of a thinner material and still be able to resist the same inner pressure as a pipe without ridges, which will save material. These pipes are very suitable as water pipes because they endure a high internal pressure.

In the device according to FIG. 9 the ready made gilled pipe 18 is continuously moved through the sleeve 29. Through the nozzle or nozzles is passed to a foam plastic material, for example polyurethane, together with some porous making material, for example a fermenting agent. As the pipe is moving through the sleeve a certain quantity of said material 34 will be located in the space 33 between every fin 32. If the material is mixed with a fermenting agent said spaces are not to be completely filled by the material, but they are to be half filled for example, whereafter the material 34 will expand so that it will completely fill said spaces 33. In order to facilitate the movement of the pipe through the sleeve and also to obtain an even and smooth surface of the filling material, oil or some other lubricating agent can be continuously applied between the pipe and the sleeve by conduits 35. Close to the outfeed end the sleeve can be provided with cooling conduits for cooling the pipe.

Figure 3:
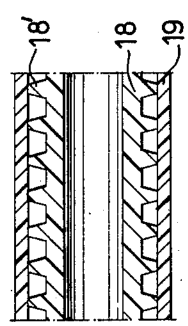
FIG. 3 shows a longitudinal section of a part of a pipe produced by a device according to the invention.

According to FIG. 3 the gilled pipe 18 produced in the manner described above is provided with fins 18′ having a preferably annular cylindrical peripheral surface and around the gilled pipe a pipe 19 with smooth inner surface and preferably of plastic is located, the inner side of said pipe 19 fitting closely to the peripheral surfaces of the fins 18′. The pipes 18, 19 can be made separately and thereafter assembled together or they can be made together, whereby the pipe 19 is continuously extruded on the gilled pipe 18 as said pipe 18 is fed out from the mould jaws. Thereby, the wall of the gilled pipe will be substantially reinforced and able to resist great forces which can arise when the pipe is located under the ground surface, and the closed spaces between the fins will increase the thermal insulation of the pipe wall, so that the pipe can be laid in the ground at a higher level than normal, which will save work. The closed spaces between the fins can be filled with for example a foamed plastic material with closed cells in order to attain a very good thermal insulation. The spaces can be filled with for example polyurethane or some other insulating material and the inner pipe can be made of polypropylene, which can resist temperatures of up to about 120° C, which would give as a result that the pipe safely could conduct hot water of about 90° C and consequently would be suitable for hot water transport.

In the device shown in FIG. 10 a gilled pipe is produced by means of mould jaws. Immediately after the production the pipe is fed through a sleeve 29, whereby the spaces between the fins are filled with some insulation material. Immediately thereafter the pipe is fed through a sleeve 44, where material is applied by the nozzle 49, whereby the pipe is provided with an outer tubular cover. In this way a gilled pipe is produced with insulation material between the fins and provided with an outer tubular cover in one single machine. In the device with mould jaws the mandrel is suitably provided with cooling conduits and also the sleeve 29 is suitably provided with cooling conduits, so that the pipe is effectively cooled between each step. After the sleeve 44 the pipe can be cooled in a water bath.

Figure 13:
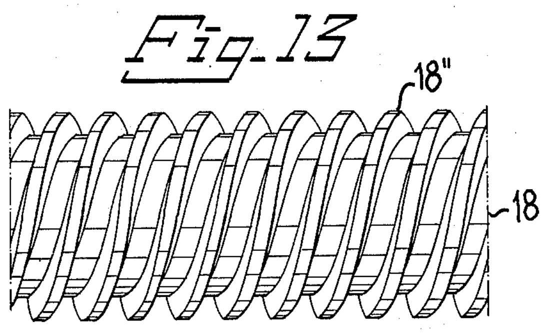
FIG. 13 shows a pipe produced by an alternative embodiment of the device according to the invention.

If the fins 18″ extend helically as shown in FIG. 13, a helix shaped channel is formed on the outside of the pipe. If such a pipe is provided with a tubular cover, some fluid or other medium can be made to stream through said channel, for example some heating or cooling medium. Alternatively, some insulating material, such as mineral wool or glass wool, can be wired on the pipe in such a way that the insulating material will partly or completely fill the helix formed channel. Thus a gilled pipe is produced with insulating filling material between the fins but without any outer pipe. If desired an outer pipe can thereafter be placed on the pipe produced in the manner described above.

Figure 14:
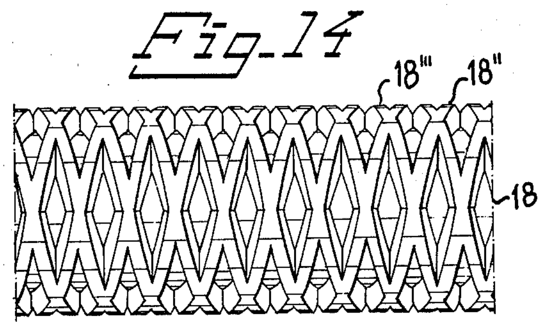
FIG. 14 shows a pipe produced by a further alternative embodiment of the device according to the invention.

In pipes of the kind which is shown in FIG. 14 the fins 18'' and 18''' extend in helix form in opposite directions, whereby a chequered net is formed on the pipe surface, which makes the pipe very strong and gives it a very good resistance against internal as well as external pressures. The fins form threaded patterns in each direction and can have for example three entries, as is shown in FIG. 14. Thereby the helix form will be very steep, which results in more or less square chequers when the pipe is provided with both right and left threaded fins, as is shown in FIG. 14.

Figure 11:
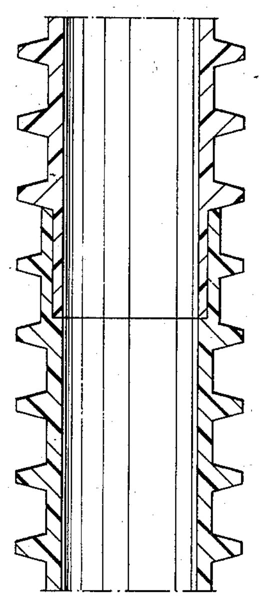
FIG. 11 shows two jointed pipe lengths.

Pipes as described above are preferably made in lengths of for example about 5 *m.* Said lengths can be jointed in various ways. For example at one end of such a pipe length the fins can be removed in a suitable way, see FIG. 11, for example by turning, along a short distance from the pipe end. At the opposite end of such a pipe length the end is widened in a suitable way along a corresponding distance. In this way the pipe lengths can be jointed by inserting one end of one pipe length into the other end of the next.

Pipe lengths which are made by the sleeve according to FIG. 9 can be jointed in the same way. Thereby the fins as well as the filling material are removed from the one pipe end.

Pipes according to FIG. 3 where an outer pipe 19 is arranged on the gilled pipe 18, can be jointed in various ways. The gilled pipe lengths can be jointed in the way described above, whereafter the outer pipe is arranged on the jointed gilled pipe lengths so that it will overlap the joints. The outer pipe is jointed in the following way. One end of the lengths is widened in some suitable way. Thereafter the lengths can be jointed by their ends being inserted into each other. The gilled pipe lengths can also be jointed in some other way. The ends of the gilled pipe lengths can for example lie against each other inside the outer pipe.

Figure 12:
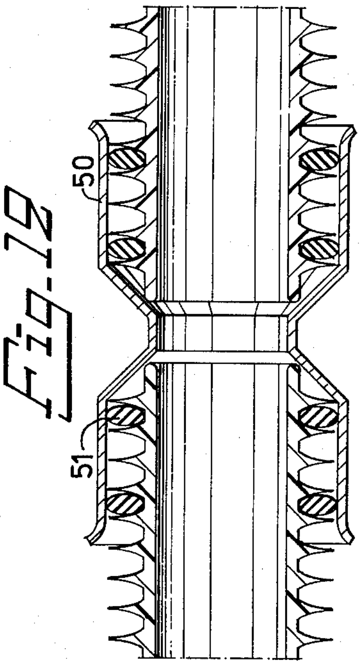
FIG. 12 shows two pipe lengths jointed in another way.

As an alternative the lengths can be jointed in the manner shown in FIG. 12. In this case a sleeve 50 is provided, into the ends of which the ends of the two pipes are inserted. Sealing rings 51 can preferably be provided in the way shown in FIG. 12 in order to prevent leakage at the joint. With this joining device the fins of the pipe ends need not be removed, and the device is very suitable as well for pipes without filling material as for pipes with filling material between the fins and also for pipes with an extra outer pipe.

Figure 15:
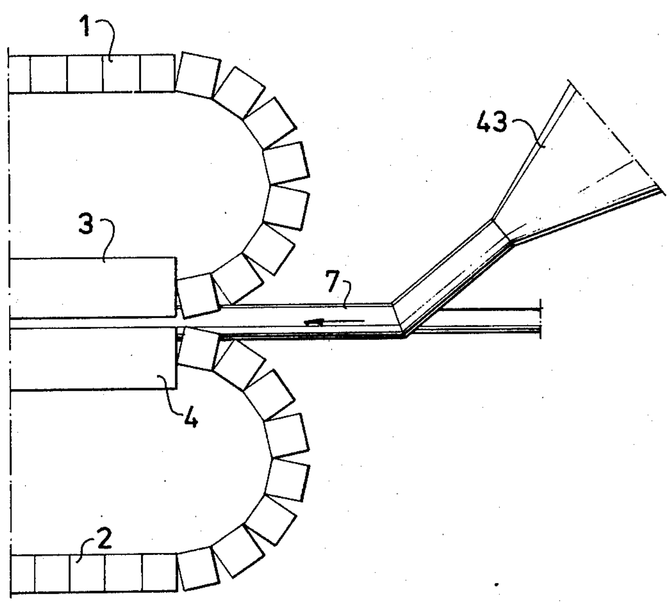
FIG.15 shows a part of the device according to FIG. 1 with a modified means for supplying material to the extruder.

The embodiments of the devices described above can of course be modified within the scope of the invention. The pipes can for example be made with great diameter and with deep fins, which pipes will be suitable as road culverts or the like. Another material than plastic can be used, for example aluminum. Furthermore the material can, if desired, be supplied in another way than by the annular nozzle channel 11. The material can for example be supplied by one or more nozzles 43, which is or are directed at an angle to the longitudinal direction of the mandrel, and which open before the mould jaws come together at the rails 3 and 4 as seen in the movement direction of the mould jaws. This is shown in FIG. 15. The part of the mandrel, which is situated nearest to the nozzle or nozzles, can have a greater diameter than what is shown in FIG. 2–5, whereby a greater space is obtained in the mandrel for example conduits for cooling medium and air.

I claim:

1. A forming device for producing gilled pipes of extrudable material received from an extruder, said forming device comprising, a nozzle sleeve coupled to said extruder, a mandrel disposed in said nozzle sleeve and extending substantially therebeyond and defining therewith a tubular channel having an axially oriented orifice to enable passage of the extrudable material therepast, plural pairs of mould jaw halves arranged for transportation in an endless series, each mould jaw half having generally annular groove means formed in the inner wall surface thereof, guiding rail means coaxial with said nozzle sleeve and guiding said mould jaw halves so that they are brought together at the nozzle sleeve and at the mandrel, and that they separate after passing a distance coupled together to define a forming zone, said nozzle sleeve being coaxial with said mould jaw halves and being spaced inwardly from the inner walls thereof, and means forcing the extrudable material into a plurality of the grooves of said groove means within the forming zone substantially to fill same simultaneously with the formation of a smooth interior wall surface, said forcing means comprising an enlarged diameter head formed on the mandrel coaxial therewith and spaced from said orifice when said mandrel is within said forming zone, said head having a cylindrical, smooth surface external configuration for forming said interior wall surface and said mandrel having a conical portion integral and coaxial with said head and mandrel located adjacent said head, the generatrix of said conical portion forming an angle of less then 45° with the axis of said conical portion and mandrel, the distance along said mandrel from said orifice to said head being about four to five times the mandrel diameter at said orifice.

2. A device according to claim 1, wherein one of said guiding rails is stationary and the other is displaceable, spring means biasing said other guiding rail toward said one guiding rail, said other guiding rail being displaceable within certain limits from said stationary guiding rail against the bias of said spring means in a direction perpendicular to the facing surfaces of said mould jaw halves whereby said mould jaw halves are separable within said certain limits when the material fed into said forming zone is under an abnormally high pressure.

3. A device according to claim 1 and thermostatically controlled electric heating coils located at least at that portion of the enlarged head which is most remote from the orifice for heating the outer cylindrical surface thereat whereby the adjacent layer of the formed pipe interior wall is melted to obtain a smooth inner pipe surface.

4. A device according to claim 1 in which said mandrel has perforate means formed along that length thereof projecting out of said orifice, said mandrel having an axial passage communicating to said perforate means pressurized fluid being fed to said axial passage for feeding same from said perforate means to the interior of said forming zone for internally supporting the outfed tubular extrudable material.

5. A device according to claim 4 wherein said head includes a first shoulder having the same diameter as the inner diameter of the to be formed pipe, an extension fixedly connected to said shoulder and having a smaller diameter than the inner diameter of the to be formed pipe, said extension having fluid supply conduit in communication with said axial passage, said extension carrying said perforate means and having plural fluid channels formed therein and communicating between said perforate means and said supply conduit whereby fluid under pressure is directed to the surface of said extension.

6. A device according to claim 5 wherein said extension has a free end remote from said shoulder fixedly connected thereto and having the same diameter as said first shoulder, said second shoulder carrying conduits capable of receiving a cooling medium.

7. A device according to claim 1 in which the mandrel has plural longitudinal grooves and the inner facing surfaces of said mould jaws have inwardly directed projections along the corresponding locations, whereby longitudinal ridges are formed on the inner wall surface of the formed pipe and longitudinal lines of recesses are formed on the corresponding locations on the outer wall surface of the formed pipe, said recesses extending into the formed pipe somewhat farther than the normal thickness of the formed pipe wall but without perforating said ridges.

8. A device according to claim 7 in which there is a rotatable shaft extending through the mandrel, said shaft extending beyond that end of the mandrel most remote from said orifice, adjustable cutting means fixedly connected to said rotatable shaft, said cutting means arranged to sever said ridges from the formed pipe forming a perforated pipe.

9. A device according to claim 1 in which said mould jaw have longitudinal grooves formed between the radial groove means in the facing surfaces thereof, whereby longitudinal reinforcement ridges are formed between the radial ridges on the external surface of the formed pipe.

10. A device according to claim 1 and a sleeve arranged for receiving the formed pipe therethrough, communicating with said sleeve for supplying heat insulating plastic material between the pipe and the sleeve wall to fill the spaces between the fins of the formed pipe.

11. A device according to claim 10, in which said sleeve has radially extending canted passageways formed therein communicating to the formed pipe for applying a lubricant between the sleeve and the pipe.

12. A device according to claim 10 wherein said sleeve has conduit means for receiving a cooling medium said conduit means being formed at least near the outfeed end of said sleeve.

13. A device according to claim 1 in which a sleeve having an inner diameter greater than the outer diameter of the formed pipe is disposed about said formed pipe for receiving same therethrough, and at least one nozzle adjacent said sleeve for feeding extruded material between the sleeve and the formed pipe for extruding a second pipe having an even wall surface around the said formed pipe, said inner wall surface of said second pipe fitting tightly around the outermost circumferential surfaces of the said formed pipe.

14. A device according to claim 1 and in combination therewith a device for filling the spaces between the fins of said formed pipe and a device thereafter for locating an outer pipe on said formed pipe and means for cooling the formed pipe between each step.

15. A device according to claim 1 wherein said grooves on the interior surface of said mould jaws are helix formed.

16. A device according to claim 15 in which there are two sets of grooves on the interior wall of each mould jaw, said sets of grooves helically in opposite directions and each set having three entries.

* * * * *